United States Patent [19]

Ruhl

[11] 4,212,016

[45] Jul. 8, 1980

[54] VEHICLE MULTICONDITION RECORDING SYSTEM

[76] Inventor: Herman Ruhl, 30 Queen Elizabeth Blvd., Toronto, Ontario, Canada, M8Z 2T6

[21] Appl. No.: 837,503

[22] Filed: Sep. 29, 1977

[51] Int. Cl.² .................... G01D 9/28; G01D 15/16
[52] U.S. Cl. ............................ 346/62; 346/121
[58] Field of Search ............... 346/34, 62, 33 D, 64, 346/121, 123

[56] References Cited

U.S. PATENT DOCUMENTS

| 3,197,779 | 7/1965 | Chatelain et al. | 346/64 X |
|---|---|---|---|
| 3,200,403 | 8/1965 | Bush | 346/61 |
| 3,213,459 | 10/1965 | Bramsch et al. | 346/33 D |
| 3,388,404 | 6/1968 | Bush | 346/61 |
| 3,599,224 | 8/1971 | Hahn | 346/61 |
| 3,624,660 | 11/1971 | Fichter | 346/62 X |
| 3,683,404 | 8/1972 | Dennis et al. | 346/34 |
| 3,720,943 | 3/1973 | Smith | 346/62 X |
| 3,855,599 | 12/1974 | Helmschrott et al. | 346/62 |
| 4,051,482 | 9/1977 | Andresen | 346/62 X |
| 4,074,273 | 2/1978 | Dupree et al. | 346/62 X |

Primary Examiner—George H. Miller, Jr.

[57] ABSTRACT

The specification describes a recording system for the recording of a multiplicity of vehicle operating conditions on a chart. The system includes: recording means for inscribing on the chart; servocontrolled positioning means for positioning and moving the recording means to recording position; and control means which selectively directs different control signals to the servocontrolled positioning means.

15 Claims, 9 Drawing Figures

VEHICLE MULTICONDITION RECORDING SYSTEM

FIELD OF THE INVENTION

This invention relates to an instrument which records a multiplicity of vehicle operating conditions. Such instruments are generally known as tachographs.

BACKGROUND OF THE INVENTION

Motor driven vehicles such as trucks, boats and the like, are driver operated away from supervision. Such vehicles are large energy users making them very costly to operate. Control is required to assure safe as well as energy and maintenance saving operation. Increasing complexity requires that more and more functions be controlled. It is desirable to continuously analogue record certain of the more critical conditions. Others may be recorded in an on/off manner to observe whether or not undesirable conditions exist.

Presently available recording instruments use a plurality of styli for the recording of more than one variable. However, because such instruments mounted in the vehicles must be small, there is an obvious constraint of space and the recording area on the charts is quite limited. This in turn, limits the number of styli which can be used to record different functions on the chart.

Another method used to increase the recording space on a chart, is to record from both sides of the paper disc forming the chart by means of opposed styli. Although this arrangement overcomes the problem to a certain extent, it still does not maximize the recording area available on the chart.

Present recording systems assign a stylus for each parameter or operating condition to be recorded. Therefore the number of variables which can be recorded is restricted due to the very limited number of positions assignable to each stylus. Most present systems have a capacity of three styli on each side of the paper disc.

The present invention maximizes the useable recording area on a chart. It is based on controlling the stylus such than an individual stylus can record a multiplicity of operating conditions. The system preferably incorporates a single stylus which is electronically controlled. It could however be mechanically controlled and include more than one stylus.

The recording system of this invention therefore, is for use in vehicles and records a multiplicity of operating conditions on a chart. The system includes: the combination of recording means which inscribes on the chart at essentially right angles to the chart's direction of movement; servocontrolled positioning means for positioning and moving the recording means to a recording position in response to a control signal; and control means to selectively direct different control signals for the multiplicity of operating conditions to the servocontrolled positioning means.

BRIEF DESCRIPTION OF THE DRAWINGS

The above, as well as other advantages and features of the present invention will become apparent in the following detailed description of the preferred embodiments according to this invention, wherein.

DETAILED DESCRIPTION OF THE PREFERRED EMBODIMENTS

The following description relates to control signals having different voltage levels in which each voltage level corresponds to a different operating condition. It is to be understood that control signals or predetermined different frequencies relating to the various operating conditions can also be used to carry out the invention.

Figure 1:
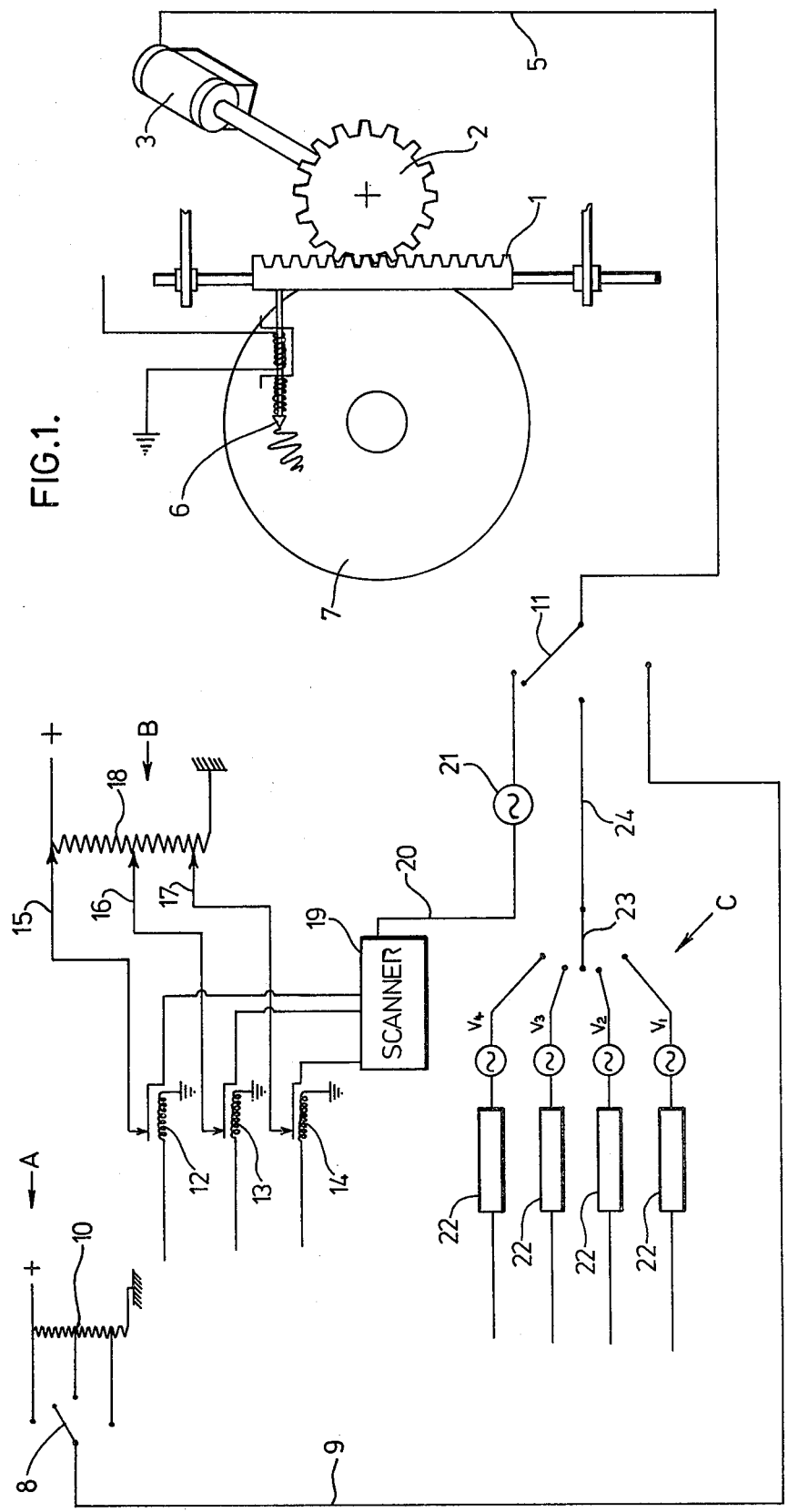
FIG. 1 is a schematic view of the system showing a plurality of alternative control means.
Figure 3:
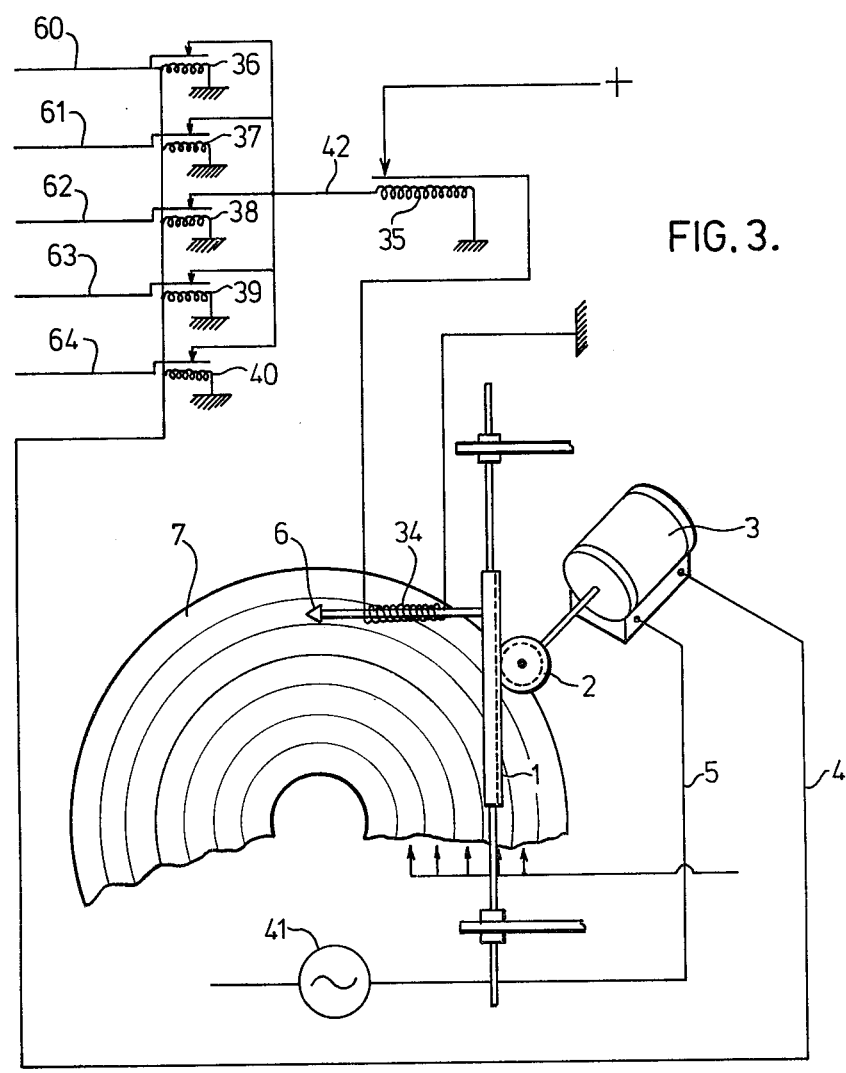
FIG. 3 is a schematic of a recording system used for the recording of independent simultaneously occurring vehicle operating conditions.

FIG. 1 shows a recording system provided with stylus guide 1 having a rack engaged by gear 2, the position of which is determined by motor 3. Motor 3 as shown in FIG. 3 carries a feedback mechanism providing a voltage output to line 4, which is proportionate to the position of stylus guide 1. The internal control of the motor automatically responds to a voltage input through line 5, in such a manner that the feedback voltage along line 4 is adjusted to the level of the input voltage. Therefore, by applying appropriate voltages through line 5, one can select the desired position of stylus guide 1. The stylus guide carries stylus 6, which inscribes on chart 7. Chart 7 is held and rotated by a conventional clock mechanism. (not shown)

The stylus and the guide carrying the stylus move at essentially right angles to the direction of rotation of rotating chart 7. The stylus provides the recording means, while the motor with gear and stylus guide constitute the servocontrolled positioning means. Through the use of control signals, the recording means are controlled to assume a position corresponding to the signal value.

By suitable alternate selection from two or more input signals, the recorder can now be made to record a variety of functions.

Figure 6:
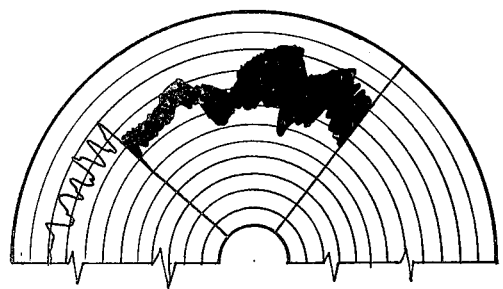

The analogue values of different parameters or operating conditions can be consecutively scanned and recorded in a predetermined pattern or in an irregular sequence as may be required. As shown in FIG. 6, the stylus records these parameters as lines or bands of different thicknesses with the upper edge of the line or band representing the analogue value and the width of the line or band indicating which parameter is recorded.

Figure 8:
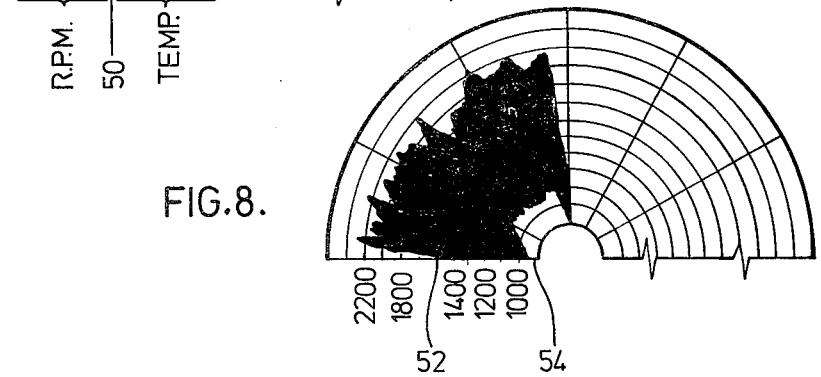
Figure 9:
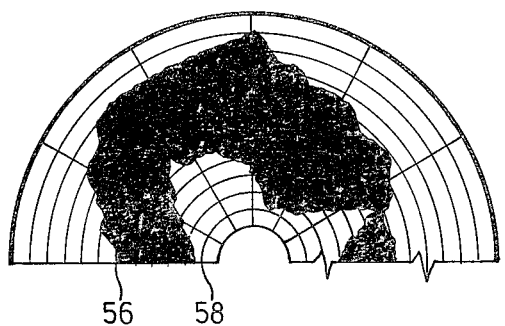

Two parameters may be recorded starting from different base lines as shown in FIG. 8. On the other hand, one can use a common base line by suppressing value ranges normally not occuring or not being of interest and record one condition in the upper portion of the available total stylus travel and another in the lower portion. By switching in short time intervals the signal voltages for the servocontrolled driving means of the stylus between those of the parameters the stylus moves in short sequence between the points indicative for their value on the chart. As shown in FIG. 9, this creates a solid band of varying width. The upper borderline of the band showing the values of one and the lower borderline the value of the other parameter as an essentially continuous graph line.

The most simple type of multiple recording consists in using an input system generally indicated at A as shown in FIG. 1. It consists of a control means comprising hand switch 8 with which line 9 can be connected alternatively to different voltage levels available from a voltage divider 10 which is one form of a control signal generating means. By assigning for instance different work situations of a vehicle driver like waiting, loading and unloading to the different voltage levels, the occurrence of such work situations can be recorded on chart 7 by putting the hand switch in the corresponding position and by moving switch 11 to a position where it connects line 5 with line 9. Motor 3 will then move stylus 6 to positions corresponding to the voltage level selected by hand switch 8.

An automatic recording of vehicle operating conditions like engine operating parameters or conditions of auxillary equipment on a vehicle can be made by using the input system B shown in FIG. 1. Engine operating systems are in many instances presently equipped with pre-set limit switches which provide a warning signal, i.e., a warning light or a buzzer, if crucial parameters such as the coolant level, oil temperature, air pressure etc., which are automatically sensed are in a critical condition. In input system B these warning signals would be individually connected to the control means comprising relays 12, 13, 14, etc. These relays connect lines 15, 16, 17, etc. which take signals of different voltage levels from the control signal generating device 18 to a scanner 19. Scanner 19 continuously scans lines 15, 16, 17.

If for instance the coolant level drops below the warning point the warning signal will activate a relay 12 and will therefore bring the voltage of line 15 into the scanner. When the scanner finds this voltage it will stop for a predetermined period and transmit via the output line 20 the corresponding voltage to the motor 3 through switch 11 which has been set to select the mode of control supplied by input system B. Oscillator 21 is provided in line 20. This oscillator acts as a control signal pattern generating means and superimposes on the constant voltage supplied through line 15 from the signal generating device 18 an oscillating voltage between zero and one Volt. Therefore, the recording stylus 6 does not remain in a steady position. It moves according to the voltage oscillation and inscribes a narrow solid band on the chart as shown in the left portion of FIG. 4.

Another application of the invention is realized by using the input system C shown in FIG. 1. A variety of analogue input signals as for instance rpm, exhaust temperature, water temperature, oil pressure are connected to signal conditioners 22 if the direct input signals are not compatible with the required voltages on line 5. Each signal then passes through a control signal pattern generating device such as oscillators V1, V2, V3 and V4 respectively. These control signal pattern generating devices superimpose an oscillating voltage which is different for each channel. Whenever one of the analogue channels is connected by switching or control means 23 to line 24 and line 24 is connected by selector switch 11 to line 5, then the corresponding analogue signal with a superimposed identifying oscillating voltage is recorded by stylus 6 on the chart. The chart recordings will easily allow identification of the recorded signal by the width of the inscribed band determined by the respective control signal pattern generating device.

FIG. 6 shows for instance three different parameters. RPM of the engine are recorded as thin lines. The temperature is recorded with a narrow band and the pressure is recorded by a wide band.

Figure 5:
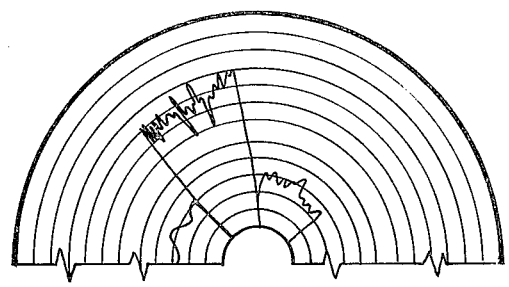

Recordings obtained without the signal generating device are shown in FIG. 5. As can be seen, these different parameters are only recognizable when they appear on distinct and separate locations on the chart. If these recording lines for different parameters appear in the same portion of the chart, there is an obvious interpretation problem. This is avoided through the use of the control signal pattern generating device.

Figure 2:
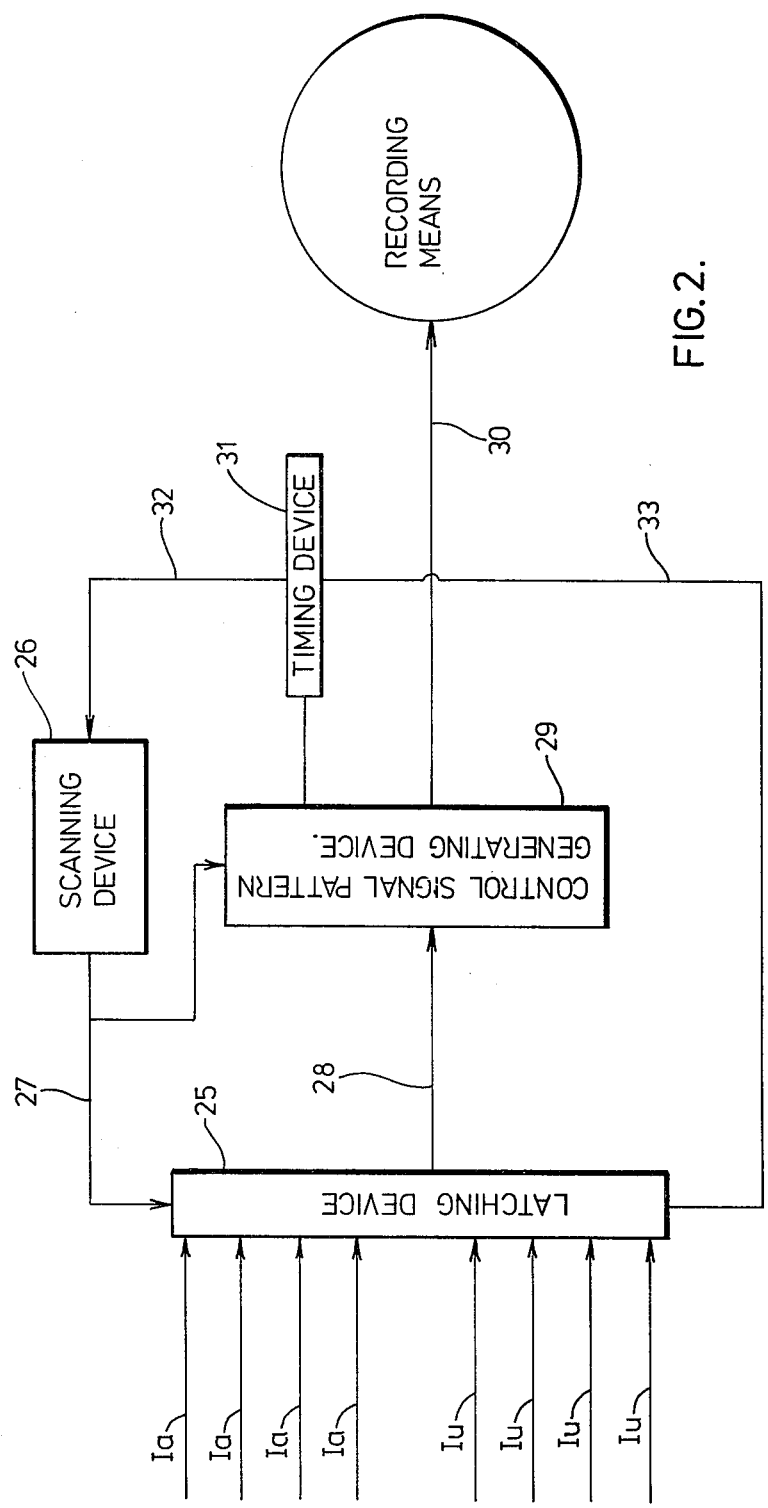
FIG. 2 is a schematic of a control means used for the automatic recording of vehicle operating conditions.

The applications described so far deal with situations in which the parameter to be recorded is selected by hand or in which the conditions to be recorded are such that only one of them can exist at anyone time. Should, however, conditions occur simultaneously or in very short sequence of each other, a special scanning system as shown in FIG. 2 presents a refinement of the invention. This scanning system can take the place of scanner 19 in the case of parameters which may occur simultaneously. The warning limit input channels Ia and Iu, which carry signals from automatic limit switches, activate individual latches in a latching device 25. A scanning device 26 scans these latches continuously over scanning line 27 in a given sequence and connects the warning signal of the channel concerned with the output line 28 of the latch. Simultaneously, the scanning device 26 connects in the same scanning sequence, an individual pattern created by the control signal pattern generating device 29 with output line 28 and output line 30. The scanning device controls therefore, the warning input channel which is latched. The latch signal is for a predetermined time transmitted through line 28 into the control signal pattern generating device where an identifying signal pattern is superimposed on the signal. This so modified and identified signal is sent through line 30 into the servocontrolled positioning means which moves the recording stylus to a recording position.

When the control signal pattern generating device 29 receives an input through line 28, a timing device 31 is activated for a predetermined timing period. During this timing period, the timing device sends a signal along line 32 to the scanning device, thereby stopping the scanning device and maintaining a connection between the latch and the control signal pattern generating device through line 28. The timing device can be set to different time periods. These time periods are selected such that the event which is recorded is clearly recognizable on the chart. Therefore, to a certain extent, the timing period is dependent upon the speed at which the chart travels. At the end of the pre-set time period, the timing device sends a release signal along line 33 to the latching device thereby cutting off the signal along line 28 and a re-start signal along line 32 to the scanning device, which continues its scanning until it again finds a latch in a latched condition. The cycle then reoccurs.

After having scanned all the latches in the latching device, the scanning device repeats its cycle of scanning. If during the next cycle one of the channels is still in the warning mode, the warning signal reactivates the corresponding latch and this warning signal is again recorded on the chart for a predetermined time period. If between scans the warning signal has disappeared, then there is no repeat recording of the condition.

According to a preferred embodiment of this invention, control signal pattern generating device 29 is eliminated and each of the warning limit switch event channels Ia and Iu is provided with its own individual control signal pattern generating devices such as those shown in in-put system C of FIG. 1, marked V1 through V4.

Furthermore, the latching device can be set up such that it will only react to a signal of a certain level or a certain duration and signals below that level or duration are not latched in the latching device. The latching device may be replaced by other signal storage means or memories for the storing of the various signals relating to the warning conditions.

Figure 4:
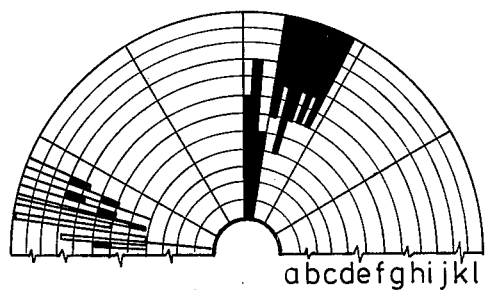
FIGS. 4 through 9 are representative of charts onto which various operating conditions have been recorded.

FIG. 4 shows a warning pattern as recorded by the above-described system. The chart includes different radial fields in which the warning signals are recorded as a band. The signal pattern carrying device may be designed to drop the voltage to zero along line 30 when no warning condition exists. FIG. 4 shows this arrangement in which the stylus advances from zero to radial field g for the recording of a condition. After recording for the period of time set by the timing device, the stylus first returns to zero and then moves to radial field g for the recording of a second warning condition. Again the stylus returns to zero and thereafter records in radial field e. These recordings appear in the central portion of FIG. 4.

The warning conditions recorded in radial fields g, i, and e are not serious enough to require an immediate shutdown of the vehicle. These warning signals are therefore transmitted along lines Ia to the latching devive.

Should the conditions become dangerous to the extent that an immediate shut-down is required and a second warning signal from the same warning switch or a signal from a warning switch at a different signal level, is sent to the latching device along channels Iu, which carry information relating to shut-down conditions.

The control signal pattern generating device 29 may identify the shut-down conditions in the same identifying radial fields A-I of FIG. 4. However they are identified in a different manner. As is shown in the central portion of FIG. 4, the recording stylus has returned to the zero line at the centre of the chart only for the first three events. The fourth recorded warning event, the second one recorded in field g shows the recording stylus moving to the outer edges of the chart for all following warning recordings which relate to shut-down conditions. Therefore, the three additional events shown in fields i, g and e occurred as shut-down conditions in which case the initial warning condition had deteriorated to a shut-down condition. This recording pattern can be effected by selecting a signal pattern for shut down conditions in which the stylus will receive a full voltage at the beginning and the end of each recording period determined by the timing device 31.

Figure 7:
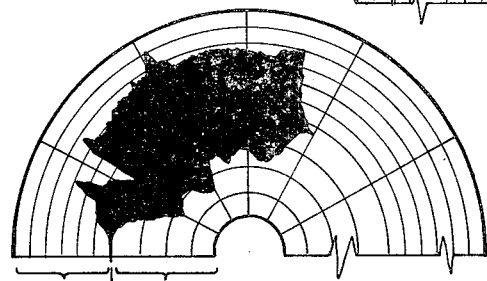

In another application of the invention it is possible to record two parameters in an analogue fashion. Two different possibilities of recording are shown in FIG. 7 and FIG. 8.

These recordings are obtained by adapting switching means 23 such that it automatically switches line 24 in a pre-set time pattern between the various input channels. In this case the signal conditioners 22 function in the following manner. In order to obtain the recording pattern as shown in FIG. 7 in which a common base line 50 is used the signal conditioner for the rpm channel provides a voltage to line 24 which brings the stylus into the zero position. With increases of the rpm the voltage increases and reaches a maximum at a location above the base line. Therefore, whenever line 24 is connected to V4 generating a control signal pattern relating to rpm, the stylus assumes the position between base line 50 and locations above the base line which correspond to the rpm of the motor.

In order to operate from the common base line the signal conditioners for both rpm and exhaust temperature provide identical voltages when both conditions are at zero. As the input signals are transmitted to the servocontrolled positioning means the stylus moves above and below the common base line depending upon which condition is being recorded. If both conditions remain at zero the stylus will record along the zero line.

FIG. 8 shows a modified recording pattern for recording rpm which is recorded in the upper radial fields with base line 52 and temperature which is recorded in the lower radial fields having a base line 54. As can be seen the low rpm ranges are suppressed so that recordings start only with 1000 rpm. Temperatures under 900 are also suppressed. Furthermore, temperature as well as rpm scales are arranged such that both are rising from the inside to the outside of the chart.

The voltages for engine rpm are processed such that anything up to 1000 rpm provides a constant voltage. Increases in rpm above 1000 rpm increase the signal voltages such that recordings above base line 52 are obtained on the chart.

Correspondingly the exhaust temperature voltages are processed such that no voltage is supplied to motor 3 when the temperature is below 900 degrees. However, between 900 and 1600 degrees a corresponding voltage increase will make the stylus record between the base line 54 and base line 52. This recording system allows therefore a convenient relatively large scale simultaneous recording of two vehicle parameters.

In addition to the recording of varying conditions, the control of vehicle conditions requires the recording of cumulative figures or the counting of events and units. This is done conventionally by recording a saw-toothed pattern. The recording stylus in such a pattern is made to move between fixed top and bottom positions. The mechanical or electrical moving means are designed in such a fashion that for each unit to be counted the stylus is made to move from the bottom upwards by a certain small increment. The number of increments or steps required to move the stylus from the bottom position to the top position is usually made equal to the number of steps required to bring the stylus from the top position back to the bottom position. In tachograph charts it is, for instance, common to make the stylus travel from the bottom to the top and the top to the bottom equal to a distance of 5 miles travelled. If the number of units to be counted remains constant per unit of time, the resulting recording looks like a saw-tooth pattern. Whenever time passes without adding any additional units the up and down lines become horizontal lines if recorded on a tape or sections of a circle if recorded on circular charts.

A modified application of this invention consists in controlling the stylus in a corresponding way by electrical means to record or count quantities. Again this system can be applied in a more advanced fashion to not only count one but two different kind of units with one stylus. An example of such recordings is shown in FIG. 9.

The radial fields above base line 56 constitute the recording area for signals relating to a first quantity, i.e., packing cycles of a garbage collection truck. The radial fields between base lines 56 and 58 constitute the recording area for information relating to a second quantity, i.e., the number of gallons of fuel consumed by the vehicle.

To record the number of units of 2 different quantities it is necessary that a pulse sending unit is provided for each of the quantities to be controlled. The number of packaging cycles can, for instance, be controlled by a limit switch actuated during each cycle of the mechanical packer, so that for each cycle one pulse is available. The number of gallons consumed by the engine can be metered by a fuel meter equipped with a pulse sending unit sending pulses for every one tenth of a gallon. Such fuel meters are commonly used and available.

The original pulses of these sending units are then modified by a pulse shaping unit, so that the resulting pulses are of constant amplitude and duration. These pulses are then accumulated in a ramp providing an output voltage which increases in equal increments with each pulse. After reaching a maximum voltage corresponding to the number of pulses which results in the upward travel of the stylus, the function of the ramp is reversed and the output voltage is reduced per pulse by the same increment or drops in one step to the minimum voltage. Therefore, the ramp converts the continuous pulses in a corresponding rising and falling output voltage. These rising and falling output voltages of each channel are then alternatively and in a short period cycle connected to the input line 5 for motor 3. This automatic cycling between the two voltages results in the recording pattern as shown in FIG. 9. This system also allows the mixing of recording patterns as shown in FIGS. 4 through 9 by one instrument on the same chart. It would, for instance, be easy to have the entire recording pattern as shown in FIGS. 8 and 9 recorded in the upper radial fields and have fuel consumption recorded in the lower radial fields.

Another possible application would be to record the number of passengers in a bus at any given moment in the upper part of the chart and to continuously record the number of passengers entering the bus in the lower part of the chart. The bottom fields would then be a quantity recording line while the top fields would represent the condition figure for any given moment.

In certain cases it may be an advantage to record a multitude of events and even simultaneously occuring events at essentially the moment that they occur. FIG. 3 shows a system adapted to carry out this type of recording. The functions of stylus guide 1, gear 2, motor 3, line 5 and feedback line 4 and chart 7 are identical to those described with respect to FIG. 1. However, this system contains a modification of stylus 6 which enables the stylus to be lifted through solenoid 34 from the chart surface. Solenoid 34 is controlled by relay 35 which is normally closed and lifts the stylus from the chart, so that no recordings occur. In broad terms solenoid 34 and relay 35 function as deactivating means for the recording stylus.

Warning limit switches (not shown) provide inputs along lines 60 through 64 to individual voltage range controlled relays 36 through 40. The voltage range controlled relays contain internal controls causing them to close only within the determined voltage limits. These predetermined voltage limits are selected to correspond to the stylus position feedback voltage supplied through line 4 such that the oil pressure relay 40 closes when the stylus is in the recording range for oil pressure, that the oil level relay 39 closes when the stylus is in the recording range for oil level, etc. The result of this calibration is that during the travel of the recording stylus from its inward position to its outer position the relays close whenever the stylus is within that respective recording range. The stylus 6 is made to perform an automatic regular travel from the top position to the bottom position by the stylus position control voltage generator 41. The speed with which this control voltage generator supplies from zero to the maximum voltage determines the speed with which the stylus 6 travels in and out with respect to the chart.

If, for instance, an oil level warning signal should be present then this signal will be transmitted through the oil level relay when stylus 6 is in the oil level range of recording. Relay 35 is then activated through line 42 to open the normally closed relay. Whenever relay 35 opens the stylus is pressed against the chart by a built-in spring. When the stylus leaves the oil level recording range the feedback voltage through line 4 either drops below or exceeds the voltage range, opening the oil level relay. This closes relay 35 so that the stylus is retracted to a non-recording position.

This invention which is based on the use of a signal stylus for recording a plurality of operating conditions offers the following advantages.

1. It permits a large number of on/off operating conditions ie. twenty to thirty depending on the width of the radial fields to be recorded in an easily identified manner on instruments of conventional size.

2. Existing instrument designs can be modified and used to obtain this versatile multicondition recording pattern.

3. Through the use of the present system a quick, easy to scan chart is obtained and by selecting all measurable parameters of engine and vehicle operation which are either unsafe, undesirable or technically damaging from an operational point of view, the malfunctions in the motorized vehicle can easily be detected.

4. A malfunction assignment of recording analogues values through the use of a single stylus is achieved by (a) selecting and manually switching from condition to condition (b) adapting the system such that the recording automatically switches to an operating condition exceeding a preset danger level and (c) simultaneously analogue recording two operating conditions by recording their values on either side of a common base line. The latter mentioned proposal also has the ramnification that in the case of a diesel engine operation RPM can be recorded on one side of the base line and heat recorded on the opposing side of the base line. The total distance between the RPM and heat recording line is an indicator of the total power level produced by the engine from which is determined the wear on the engine.

Although various preferred embodiments of the invention have been described herein in detail, it will be apparent to one skilled in the art that variations may be made thereto without departing from the spirit of the invention or the scope of the appended claims.

What I claim is:

1. Vehicle recording system for recording a multiplicity of operating conditions in a chart characterized by the combination of recording means for inscribing on the chart at essentially right angles to its direction of movement, servocontrolled positioning means for positioning and moving said recording means to recording positions in response to control signals which are the result of two separate input signals combined with one another to provide said control signals, one of said input signals identifying a particular operating condition, the other of said input signals identifying the value of that particular operating condition for simultaneous appropriate positioning of the recording means on the chart and recording of the value of each identified operating condition, control means to selectively direct different control signals for the multiplicity of operating conditions to the servocontrolled positioning means.

2. Recording system as claimed in claim 1 for recording of operator selectable operating conditions.

3. Recording means as claimed in claim 1 including switching means for selectively directing signals associated with different operating conditions to the positioning means, and signal pattern generating means interlocked with said switching means and superimposing a characteristic identifying signal pattern on each signal.

4. Recording system as defined in claim 1 wherein said servocontrolled positioning means are responsive to control signals of different frequencies and wherein the control signal is characterized by its frequency which is related to one of the various operating conditions.

5. Recording system as defined in claim 1 for recording simultaneous and quick sequence events including corresponding signals for each event, latching means for each signal, control signal pattern generating means generating a different signal pattern for each signal, timing means, and scanning means for scanning the latching means and for connecting the control signal pattern generating means with the servocontrolled positioning means, the arrangement being such that when said scanning means detects a signal the control signal pattern generating means directs a corresponding signal pattern to the servocontrolled positioning means, thereafter the timing means interrupts the scan of the scanning means which resumes its scan after a preset time of recording and opens the latching means and disconnects the signal pattern of the corresponding control signal from the servocontrolled positioning means.

6. Recording system as claimed in claim 1 for recording of automatically sensed operating conditions wherein said control means comprises at least two signal input channels for the multiplicity of operating conditions and switching means for alternatively connecting the positioning means to the different signal input channels.

7. Recording system as defined in claim 6 wherein said signal inputs are voltage level inputs relating to the various operating conditions.

8. Recording system as defined in claim 7 for continuous analogue recording of one and two quantity conditions including input signals providing counting pulses proportionate in number to the quantities to be recorded, and a ramp for converting these pulses to a cyclical proportionately stepped output voltage which rises and reaches a maximum at a predetermined number of pulses and thereafter reverses and reaches a minimum at a predetermined number of pulses.

9. Recording system as claimed in claim 1 including control signal generating means generating one or more control signals and means to selectively direct one of the control signals or a signal from one or more automatically sensed conditions to said servocontrolled positioning means.

10. Recording system as claimed in claim 9 for virtually simultaneous recording of two or more conditions including deactivating means for deactivating said recording means co-ordinating control means for said signal generating means and said deactivating means allowing selection of one or more recording patterns of the control signal, the co-ordinating control means causing the deactivating means to operate when the recording means travels outside of the selected recording pattern of the control signal.

11. Recording system as claimed in claim 9 wherein said deactivating means comprises lifting means for lifting said recording means from the inscribing position.

12. Recording system as claimed in claim 9 for continuous virtually simultaneous analogue recording of the momentary value of two conditions including two corresponding signals wherein said switching means automatically alternatively connects the servocontrolled positioning means to either signal thereby causing the recording means to move between positions corresponding to the signals.

13. Recording system as claimed in claim 9 including a plurality of sensor signal sending means and scanning means for scanning the level of the sensor signals, the arrangement being such that when any one of the sensor signal sending means shows a predetermined sensor signal level and/or the scanning means interacts with the control means and a signal predetermined output signal of the signal generating duration means relating to the one sensor signal sending means is transmitted to the servocontrol positioning means.

14. Recording system as claimed in claim 13 wherein the sensor signal sending means are selected from the group consisting of vehicle mounted sensors and hand actuated switches.

15. Recording system as claimed in claim 13 including on/off signal storage means responsive to and storing on/off signal levels of predetermined duration from the sensor signal sending means, the scanning means scanning the signal storage means and connecting the appropriate output from the signal generating means with the servocontrolled positioning means and resetting the signal storage means after the recording of the condition by the servocontrolled positioning means for a predetermined time span.

* * * * *